United States Patent
Yang

(10) Patent No.: US 9,998,696 B2
(45) Date of Patent: Jun. 12, 2018

(54) IMAGE SENSOR FLOATING DIFFUSION BOOSTING BY TRANSFER GATES

(71) Applicant: OMNIVISION TECHNOLOGIES, INC., Santa Clara, CA (US)

(72) Inventor: Zheng Yang, San Jose, CA (US)

(73) Assignee: OmniVision Technologies, Inc., Santa Clara, CA (US)

(*) Notice: Subject to any disclaimer, the term of this patent is extended or adjusted under 35 U.S.C. 154(b) by 98 days.

(21) Appl. No.: 15/216,043

(22) Filed: Jul. 21, 2016

(65) Prior Publication Data
US 2018/0027194 A1    Jan. 25, 2018

(51) Int. Cl.
  H04N 5/359    (2011.01)
  H04N 5/374    (2011.01)
  H04N 5/361    (2011.01)
  H04N 5/372    (2011.01)

(52) U.S. Cl.
  CPC .......... *H04N 5/3597* (2013.01); *H04N 5/361* (2013.01); *H04N 5/372* (2013.01); *H04N 5/374* (2013.01)

(58) Field of Classification Search
  CPC ...... H04N 5/3597; H04N 5/374; H04N 5/361; H04N 5/372
  See application file for complete search history.

(56) References Cited

U.S. PATENT DOCUMENTS

| 2010/0134648 A1* | 6/2010 | Funatsu ............ H01L 27/14609 348/222.1 |
| 2015/0200229 A1* | 7/2015 | Rotte ................. H01L 27/14812 250/208.1 |

\* cited by examiner

*Primary Examiner* — Christopher K Peterson
(74) *Attorney, Agent, or Firm* — Christensen O'Conner; Johnson Kindness PLLC

(57) ABSTRACT

A shared pixel includes a plurality of transfer gates coupled between respective photodiodes and a shared floating diffusion. Each transfer gate is coupled to receive a transfer control signal to independently control a transfer of the image charge from the corresponding photodiodes to the shared floating diffusion. Each transfer control signal is set to one of an ON value, a first OFF value, and a second OFF value. One of the control signals that is coupled to an active transfer gate is set to the ON value during a transfer operation. The control signals coupled to idle transfer gates are set to the first OFF value during a reset period prior to the transfer operation, and are set to the second OFF value during the transfer operation.

21 Claims, 3 Drawing Sheets ions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

IMAGE SENSOR FLOATING DIFFUSION BOOSTING BY TRANSFER GATES

BACKGROUND INFORMATION

Field of the Disclosure

This invention is related to image sensors. In particular, embodiments of the present invention are related to pixels having floating diffusions.

Background

Image sensors have become ubiquitous. They are widely used in digital cameras, cellular phones, security cameras, as well as, medical, automobile, and other applications. The technology used to manufacture image sensors, and in particular, complementary metal-oxide-semiconductor (CMOS) image sensors, has continued to advance at great pace. For example, the demands of higher resolution and lower power consumption have encouraged the further miniaturization and integration of these image sensors.

In a conventional CMOS active pixel, image charge is transferred from a photosensitive device (e.g., a photodiode) and is converted to a voltage signal inside the pixel on a floating diffusion node. The floating diffusion of each pixel is reset to a reset level through a reset transistor before the image charge is transferred from the photodiode to the floating diffusion for each exposure. One of the challenges faced by circuit designers when reading out the charge on floating diffusions is the image lag that may occur during the transfer of the image charge from the photodiodes to the floating diffusions.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Corresponding reference characters indicate corresponding components throughout the several views of the drawings. Skilled artisans will appreciate that elements in the figures are illustrated for simplicity and clarity and have not necessarily been drawn to scale. For example, the dimen-

DETAILED DESCRIPTION

Examples of an image sensor including a pixel of an image sensor featuring floating diffusion boosting by transfer gates in accordance with the teachings of the present invention are disclosed. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Throughout this specification, several terms of art are used. These terms are to take on their ordinary meaning in the art from which they come, unless specifically defined herein or the context of their use would clearly suggest otherwise. For example, the term "or" is used in the inclusive sense (e.g., as in "and/or") unless the context clearly indicates otherwise.

As will be shown, examples of pixel of an image sensor featuring floating diffusion boosting by transfer gates during a transfer operation in accordance with the teachings of the present invention are disclosed. In one example, the voltage level on a floating diffusion that is shared by multiple photodiodes is boosted during the transfer operation by the idle transfer gates that are coupled to the shared floating diffusion. By boosting the voltage on the shared floating diffusion during the transfer operation, charge transfer is facilitated and image lag is reduced in accordance with the teachings of the present invention. As will be shown in various examples, the transfer control signals coupled to the idle transfer gates are boosted from a lower OFF value to a normal OFF value during the transfer operation to boost the shared floating diffusion voltage by capacitive coupling in accordance with the teachings of the present invention.

Figure 1:
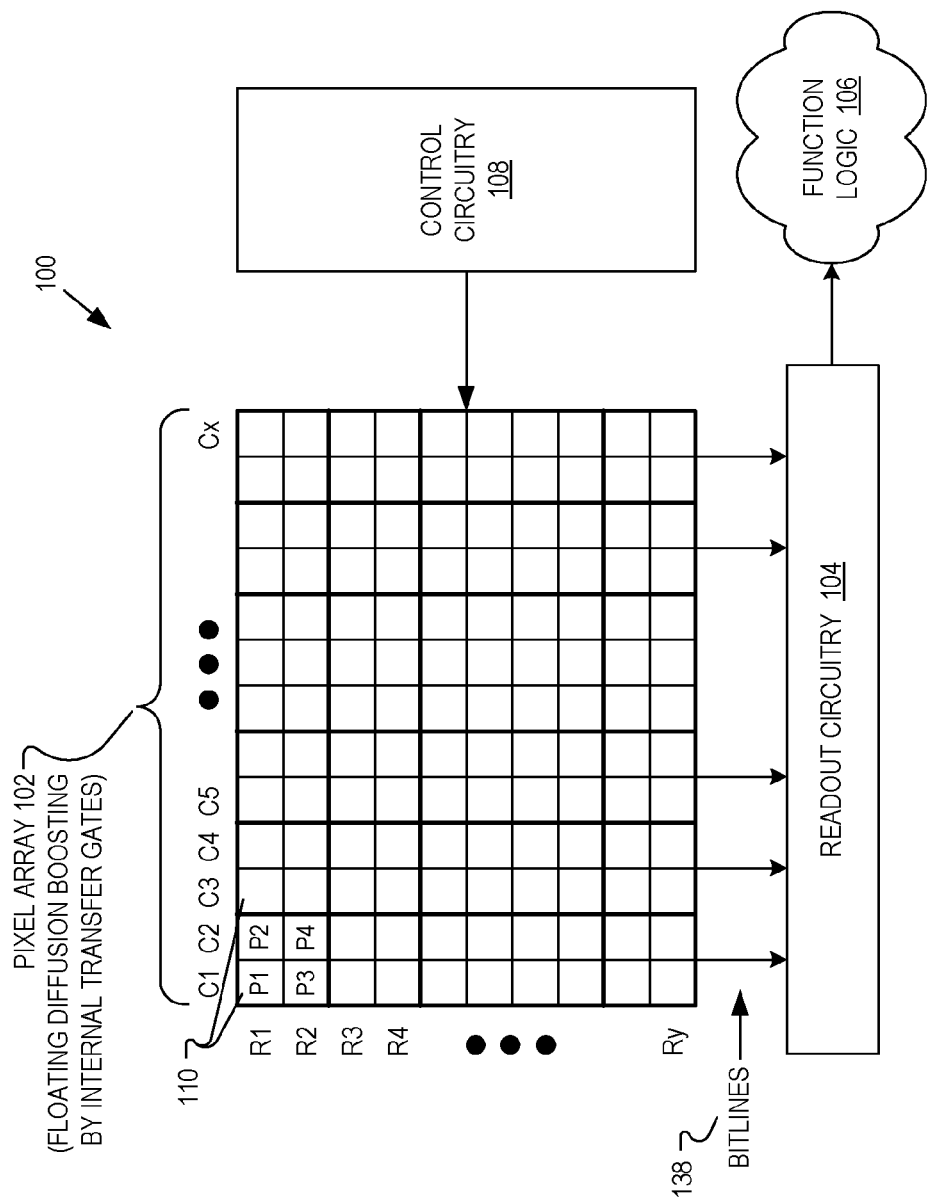
FIG. 1 is a block diagram illustrating an imaging system including a pixel array organized into groupings in which shared floating diffusions are boosted by internal transfer gates in accordance with the teachings of the present invention.

To illustrate, FIG. 1 is a block diagram illustrating an imaging system 100 including a pixel array arranged into groupings of shared pixels 110 in accordance with the teachings of the present invention. In particular, as shown in the depicted example, the imaging system 100 includes a pixel array 102, readout circuitry 104, function logic 106, and control circuitry 108 in accordance with the teachings of the present invention.

As shown in the example illustrated in FIG. 1, pixel array 102 is a two dimensional (2D) pixel array of groupings of shared pixels 110 of an image sensor. For instance, in the example illustrated in FIG. 1, each shared pixel 110 is a 2×2 shared pixel. In the example, each shared pixel includes a plurality of photodiodes (e.g., 4 photodiodes, P1/P2/P3/P4) that share a floating diffusion. As will be discussed, the shared floating diffusion of each shared pixel 110 is boosted by the idle transfer gates the respective 2×2 shared pixel in accordance with the teachings of the present invention. As illustrated, each photodiode in pixel array 102 is arranged into a row (e.g., rows R1 to Ry) and a column (e.g., column C1 to Cx) to acquire image data for an image of a person, place, object, etc., which can then be used to render a 2D image of the person, place, object, etc., in accordance with the teachings of the present invention.

In the example and as will be discussed, each transfer gate in the pixel array 102 is coupled to be independently controlled with a respective transfer control signal received from control circuitry 103. Each of the transfer control signals may be set by the control circuitry 108 to one of an ON value, a first OFF value (e.g., −1.4 volts), or a second OFF value (e.g., −1.0 volts). In operation, the active transfer gate of the 2×2 shared pixel is set to be ON while the idle transfer gates are set to be OFF during a transfer operation. In the example, the idle transfer gates in the active row are set the first OFF value (e.g., −1.4 volts) during a reset period prior to the transfer operation, and are then set to a second OFF value (e.g., −1.0 volts) during the transfer operation. In the example, the idle transfer gates in the inactive rows are set to the second OFF value. By setting the transfer gates of the idle transfer gates in the active row at the first OFF value during the reset period, and then setting the transfer gates in the active row to the second OFF value during the transfer operation, the voltage on the shared floating diffusion is boosted by capacitive coupling in accordance with the teachings of the present invention.

When the image charge has been transferred from the photodiodes to the shared floating diffusions of each shared pixel 110 as discussed above, the image charge is converted to voltage at the floating diffusions. The image data is therefore generated in response to the image charge, is read out by readout circuitry 104 through bitlines 138, and is then transferred to function logic 106. In various examples, readout circuitry 104 may include amplification circuitry, analog-to-digital (ADC) conversion circuitry, or the like. Function logic 106 may include digital circuitry and may simply store the image data or even manipulate the image data with image signal processing techniques to apply post image effects (e.g., crop, rotate, remove red eye, adjust brightness, adjust contrast, or otherwise). In one example, readout circuitry 104 may read out a row of image data at a time along bitlines 138 (illustrated) or may read out the image data using a variety of other techniques (not illustrated), such as for example a serial readout or a full parallel read out of all pixels simultaneously.

As mentioned, control circuitry 108 is coupled to pixel array 102 to control the operational characteristics of pixel array 102. For example, control circuitry 108 may generate control signals, such as the transfer gate control signals mentioned above, as well as for example, reset signals, select signals, shutter signals, and other control signals coupled to pixel array 102 to control image acquisition. In one example, the shutter signal is a global shutter signal for simultaneously enabling all pixel cells within pixel array 102 to simultaneously capture their respective image data during a single acquisition window. In another example, the shutter signal is a rolling shutter signal such that each row, column, or group of pixels is sequentially enabled during consecutive acquisition windows.

Figure 2:
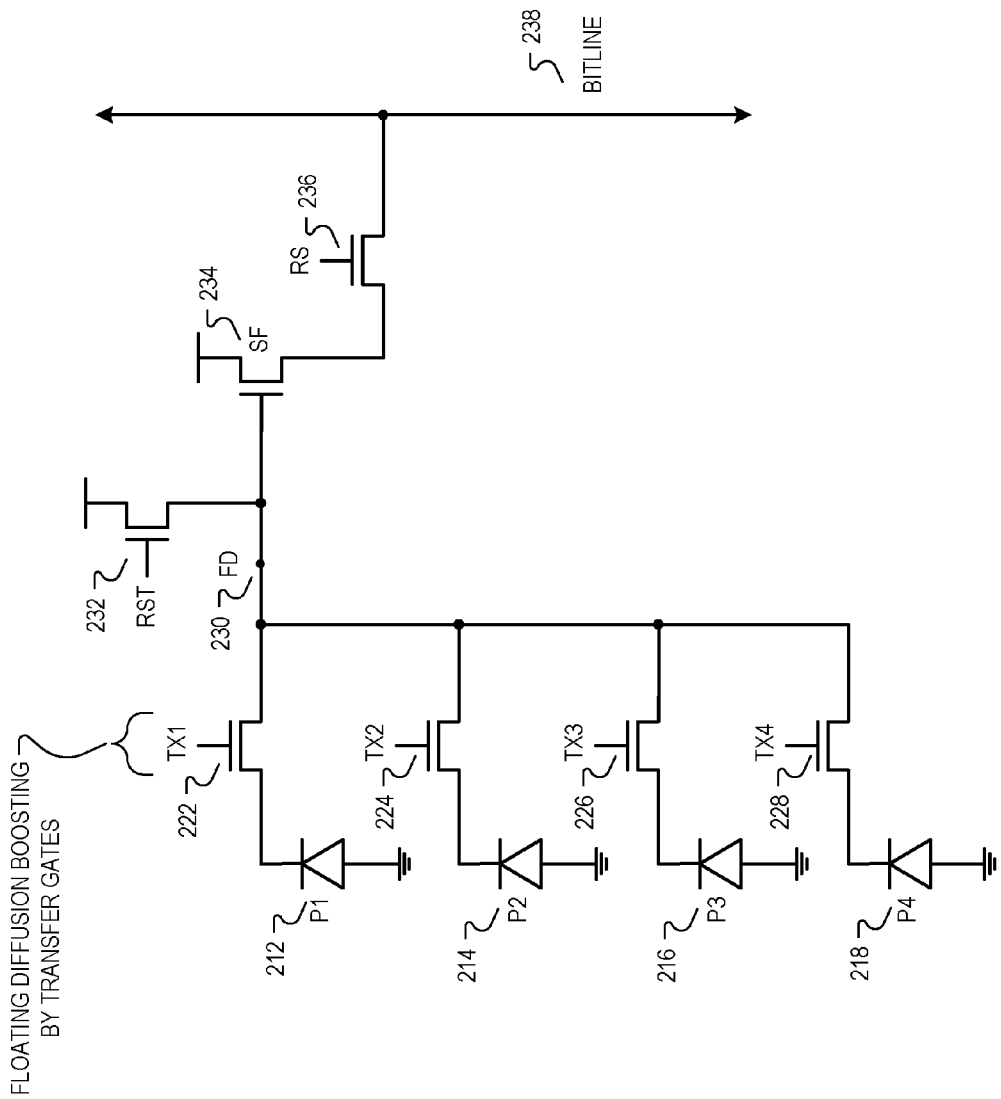
FIG. 2 shows one example schematic of a pixel of an image sensor that includes a shared floating diffusion with boosting by transfer gates in accordance with the teachings of the present invention.

FIG. 2 shows one example schematic of a 2×2 shared pixel 210 of an image sensor including a plurality of photodiodes and a shared floating diffusion that is boosted by transfer gates in accordance with the teachings of the present invention. It is noted that the shared pixel 210 of FIG. 2 may be an example of the shared pixels 110 shown in FIG. 1, and therefore it should be appreciated that similarly named and numbered elements referenced below are coupled and function as described above.

In the depicted example, the shared pixel 210 includes a plurality of photodiodes P1 212, P2 214, P3 216, and P4 218. It is appreciated of course that in other examples there may be a different number of photodiodes included in shared pixel 210, and that four photodiodes are illustrated in FIG. 2 for explanation purposes. For instance, in another example, pixel 210 may include a single photodiode. Referring back to the example depicted in FIG. 2, the plurality of photodiodes P1 212, P2 214, P3 216, and P4 218 are coupled to photogenerate image charge in response to incident light during an integration period. A shared floating diffusion FD 230 is coupled to convert the image charge that photogenerated in each one of the plurality of photodiodes P1 212, P2 214, P3 216, and P4 218 into voltages. A plurality of transfer gates, including transfer gates 222, 224, 226, and 228, are coupled between the plurality of photodiodes P1 212, P2 214, P3 216, and P4 218 and the shared floating diffusion FD 230. As shown in the depicted example, each one of the plurality of transfer gates 222, 224, 226, and 228 is coupled to a corresponding one of the plurality of photodiodes P1 212, P2 214, P3 216, and P4 218.

The example shown in FIG. 2 also illustrates a reset transistor 232 that is coupled to the shared floating diffusion FD 230. In the example, the reset transistor 232, in response to a reset control signal RST, is coupled to reset the shared floating diffusion FD 230 to a reset voltage during a reset period, which occurs prior to a transfer operation of the shared pixel 210. In addition, an amplifier transistor SF 234 having an input terminal coupled to the shared floating diffusion FD 230 is coupled to generate an amplified signal at an output terminal of the amplifier transistor SF 234. In the example depicted in FIG. 2, amplifier transistor SF 234 is a source-follower such that the source terminal of the amplifier transistor SF 234 is the output terminal, the gate terminal of input terminal, and the drain terminal is coupled to a supply voltage. In addition, a select transistor 236 is coupled between the output terminal of the amplifier transistor SF 234 and an output bitline 238. In operation, the select transistor 234 is coupled to output the amplified output of amplifier transistor SF 234 to output bitline 234 in response to a row select control signal RS. In one example, the output bitline 238 is coupled to readout circuitry, such as for example readout circuitry 104 shown in FIG. 1.

In the illustrated example, each one of the plurality of transfer gates 222, 224, 226, and 228, is coupled to receive a respective one of a plurality of transfer control signals TX1, TX2, TX3, and TX 4 to independently control a transfer of the image charge from the respective one of the plurality of photodiodes P1 212, P2 214, P3 216, and P4 218 to the shared floating diffusion FD 230. During operation, each one of the respective transfer control signals TX1, TX2, TX3, and TX 4 may be set by the control circuitry, such as for example control circuitry 108 of FIG. 1, to three different values: an ON value, a first OFF value, and a second OFF value.

In one example, the ON value is a voltage that is sufficiently high to turn ON the respective transfer gate to transfer the image charge from the respective photodiode to the shared floating diffusion FD 230. In the example, the first OFF value is a voltage having a value that is sufficiently low to turn OFF a transfer gate, and sufficiently high to prevent gate induced drain leakage dark current in the transfer gate. For instance, in one example, the first OFF value is approximately equal to −1.4 volts. In the example, the second OFF value is a voltage having a value that is greater than the first OFF value, and sufficiently low to turn off the transfer gate. For instance, in one example, the second OFF value is approximately equal to −1.0 volts.

As will be discussed in greater detail below, during operation, the control signal that is coupled to control the active transfer gate is set to the ON value to turn ON the transfer gate to transfer the image charge from the respective photodiode to the shared floating diffusion FD 230 during a transfer operation. However, the other transfer gates in the active row are idle, or turned OFF, while the active transistor transfers the image charge. In one example, the transfer control signals coupled to gate terminals of the idle transfer gates in the active row are coupled to be set to the first OFF value during a reset period prior to the transfer operation, and are then coupled to be set to the second OFF value during the transfer operation to boost the voltage in the shared floating diffusion FD 230 by capacitive coupling in accordance with the teachings of the present invention. In one example, the idle transfer gates in all of the inactive rows are set to the second OFF value.

Figure 3A:
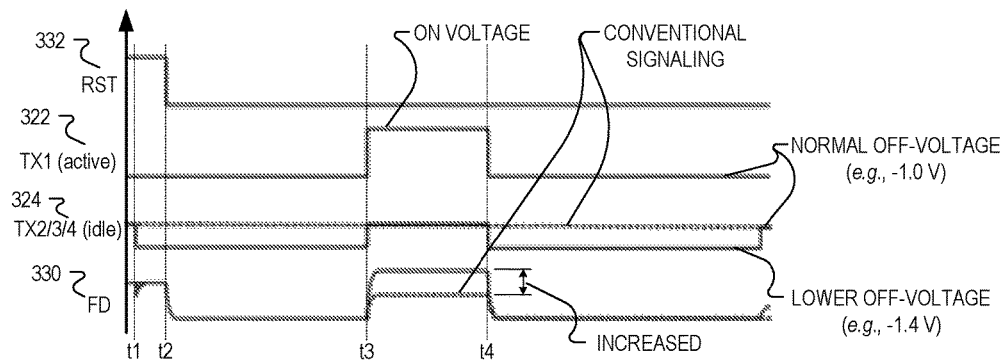
FIG. 3A shows an example timing diagram of an example pixel of an image sensor featuring shared floating diffusion boosting by transfer gates in accordance with the teachings of the present invention.
Figure 3B:
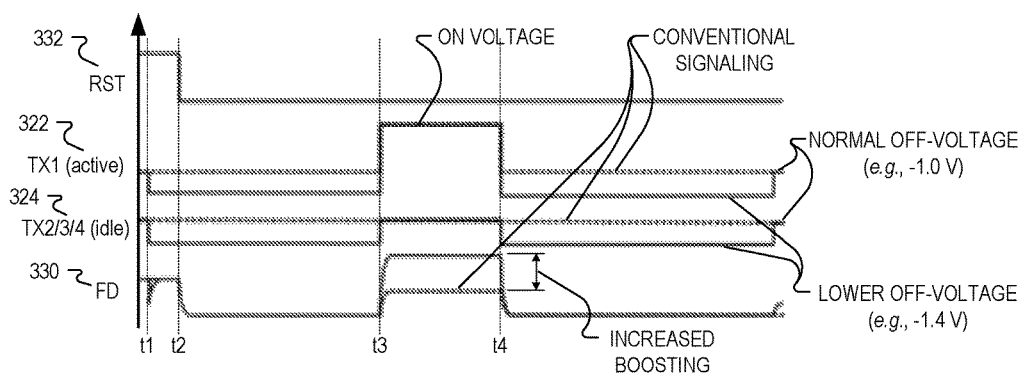
FIG. 3B shows another example timing diagram of an example pixel of an image sensor featuring shared floating diffusion boosting by transfer gates in accordance with the teachings of the present invention.
Figure 3C:
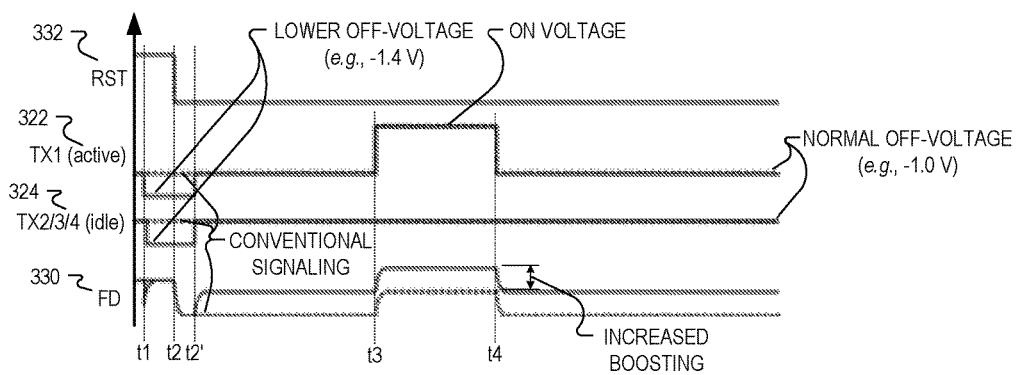
FIG. 3C shows yet another example timing diagram of an example pixel of an image sensor featuring shared floating diffusion boosting by transfer gates in accordance with the teachings of the present invention.

To illustrate, FIGS. 3A, 3B, and 3C illustrate various example timing diagrams of an example shared pixel of an image sensor featuring a shared floating diffusion boosted by transfer gates in accordance with the teachings of the present invention. It is appreciated that the control signals referred to in FIGS. 3A, 3B, and 3C may be examples of control signals referred to in FIG. 2 or FIG. 1, and it should therefore be appreciated that similarly named and numbered elements referenced below are coupled and function as described above.

The various examples depicted in FIGS. 3A, 3B, and 3C show a reset control signal RST 332, an active transfer control signal TX1 322, idle transfer control signals TX2/3/4 324, and a shared floating diffusion signal FD 330. In the example, it is assumed that active transfer control signal TX1 322 may be coupled to control transfer gate 222, which would be the "active" transistor that is transferring the image charge from the photodiode to the shared floating diffusion FD 230. Accordingly, the other transfer gates 224, 226, and 228, would be the "idle" transistors that are coupled to be controlled by corresponding transfer control signals TX2/3/4 324, as shown in FIG. 2. In addition, it is assumed that the transfer control signals illustrated in FIG. 2 are associated with an active row, and that in an inactive row, all of the transfer control signals are set to the second OFF value. As will be shown in the various examples, the idle transfer gates are coupled to be set to the first OFF value during a reset period prior to the transfer operation, and are then coupled to be set to the second OFF value during the transfer operation to boost the voltage in the shared floating diffusion by capacitive coupling in accordance with the teachings of the present invention.

For purposes of this disclosure, in the example depicted in FIG. 3A, the time between time t1 and time t2 is a reset period that occurs prior to a transfer operation. The transfer operation during which image charge is transferred to the floating diffusion occurs between time t3 and time t4 in the example. The specific example illustrated in FIG. 3A shows that during the reset period time between time t1 and time t2, the reset control signal RST 332 is ON (e.g., logic high), the TX1 332 control signal of the active transfer gate 222 is OFF at a normal OFF-voltage (e.g., −1.0 volts or second OFF value), and the TX2/3/4 334 control signals of the idle transfer gates 224, 226, and 228 are OFF at a lower OFF-voltage (e.g., −1.4 volts, or first OFF value). As such, the reset transistor 232 is ON, and the transfer gates 222, 224, 226, and 228 are all OFF, which results in the shared floating diffusion FD 330 signal being reset through reset transistor 232.

At time t2, the reset period is completed, and the reset control signal RST is turned OFF, which results in the voltage on the shared floating diffusion FD 330 signal falling as shown, due to clock feedthrough and charge injection.

At time t3, the transfer operation begins such that the active transfer gate (e.g., transfer gate 222) is turned ON in response to the active transfer control signal TX1 322. As such, the active transfer control signal TX1 322 is pulsed to the ON voltage during the transfer operation from time t3 to time t4. At this time, image charge is transferred from the active photodiode P1 212 to the shared floating diffusion FD 230. Furthermore, at this time during the transfer operation between time t3 and t4, the transfer control signals TX2/3/4 324 of the idle transfer gates 224, 226, and 228, are pulsed from the lower OFF-voltage (e.g., −1.4 volts or first OFF value) to the normal off-voltage (e.g., −1.0 volts or second OFF voltage), which boosts the shared floating diffusion FD signal 330 by capacitive coupling as shown in accordance with the teachings of the present invention. Indeed, as shown in FIG. 3A, the voltage on the shared floating diffusion FD signal 330 is boosted when compared to a conventional signaling example (shown as dashed lines) in which only a normal OFF-voltage (e.g., −1.0 volts) is used to turn OFF the transfer gates. Thus, it is appreciated that by boosting the voltage on the shared floating diffusion FD signal 330 during the transfer operation, charge transfer is facilitated and image lag is reduced in accordance with the teachings of the present invention. Continuing with the example, after time t4, the transfer operation is complete, and the active transfer control signal TX1 322 returns back to a normal-OFF voltage (e.g., −1.0 volts or second OFF value), and the transfer control signals TX2/3/4 324 of the idle transfer gates 224, 226, and 228, return to the lower OFF-voltage (e.g., −1.4 volts or first OFF value) such that transfer control signals TX1 322 and TX2/3/4 324 are all set at time t4 to the same OFF value potential after the transition operation as where they were between times t2 and t3, so that they wouldn't introduce an offset between dark (read out during t2 and t3) and signal (read out after t4) samples. In one example, after the signal is read out to the column circuits, the transfer control signals TX2/3/4 324 of the idle transfer gates 224, 226, and 228, are set to the lower OFF-voltage (e.g., −1.4 volts or first OFF value).

FIG. 3B shows another example timing diagram of an example pixel of an image sensor in which a shared floating diffusion FD signal 330 is boosted by transfer gates in accordance with the teachings of the present invention. To illustrate, in the example depicted in FIG. 3B, the time between time t1 and time t2 is a reset period that occurs prior to a transfer operation. The transfer operation during which image charge is transferred to the floating diffusion occurs between time t3 and time t4 in the example. The specific example illustrated in FIG. 3B shows that during the time between time t1 and time t2, the reset control signal RST 332 is ON (e.g., logic high), the TX1 332 control signal of the active transfer gate 222, and the TX2/3/4 334 control signals of the idle transfer gates 224, 226, and 228 are all OFF at the lower OFF-voltage (e.g., −1.4 volts, or first OFF value). As such, the reset transistor 232 is ON, and the transfer gates 222, 224, 226, and 228 are all OFF, which results in the shared floating diffusion FD 330 signal being reset through reset transistor 232.

At time t2, the reset period is completed, and the reset control signal RST is turned OFF, which results in the voltage on the shared floating diffusion FD 330 signal falling as shown, due to clock feedthrough and charge injection.

At time t3, the transfer operation begins such that the active transfer gate (e.g., transfer gate 222) is turned ON in response to the active transfer control signal TX1 322. As such, the active transfer control signal TX1 322 is pulsed to the ON voltage during the transfer operation from time t3 to time t4. At this time, image charge is transferred from the active photodiode P1 212 to the shared floating diffusion FD 230. Furthermore, at this time during the transfer operation between time t3 and t4, the transfer control signals TX2/3/4 324 of the idle transfer gates 224, 226, and 228, are also pulsed from the lower OFF-voltage (e.g., −1.4 volts or first OFF value) to the normal off-voltage (e.g., −1.0 volts or second OFF voltage), which boosts the shared floating diffusion FD signal 330 by capacitive coupling as shown in accordance with the teachings of the present invention. Indeed, as shown in FIG. 3B, the voltage on the shared floating diffusion FD signal 330 is boosted when compared to a conventional signaling example (shown as dashed lines) in which only a normal-OFF voltage (e.g., −1.0 volts) is used to turn OFF the transfer gates. Thus, it is appreciated that by boosting the voltage on the shared floating diffusion FD signal 330 during the transfer operation, charge transfer is facilitated and image lag is reduced in accordance with the teachings of the present invention. Continuing with the example, after time t4, the transfer operation is complete, and the active transfer control signal TX1 322, and the transfer control signals TX2/3/4 324 of the idle transfer gates 224, 226, and 228, all return to the lower OFF-voltage (e.g., −1.4 volts or first OFF value).

It is noted that a difference between the examples depicted in FIG. 3A and FIG. 3B is that when TX1 332 control signal is pulsed from a lower off-voltage (e.g., −1.4 volts) instead of a normal off-voltage (e.g., −1.0 volts), it has a larger boosting effect on the floating diffusion FD signal 330 due to larger voltage swing, which therefore provides the larger boosting amplitude on the floating diffusion FD signal 330. The boosting from the transfer control signals TX2/3/4 324 of the idle transfer gates 224, 226, and 228 are the same between the examples depicted in FIG. 3A and FIG. 3B.

In addition, it is noted that in another example, there is only one photodiode (e.g., photodiode P1 212) and one transfer gate (e.g., transfer gate 222) in the pixel, and the pixel is therefore not shared. In other words, in another example with respect to FIG. 2, the idle transfer gates 224, 226, and 228, and the transfer control signals TX2, TX3, and TX4 are not included. In such a non-shared pixel example with respect to FIG. 3B, the active transfer control signal TX1 322 can use the two OFF voltages (e.g., first OFF value and second OFF value) as shown in FIG. 3B to implement floating diffusion boosting in accordance with the teachings of the present invention. For instance, in one example the transfer control signal TX1 is set to the first OFF value during the reset period between t1 and t2, is set to the ON value during the transfer operation, and set to the second OFF value when pixel is in an inactive row that is not being readout.

FIG. 3C shows yet another example timing diagram of an example pixel of an image sensor in which a shared floating diffusion FD signal 330 is boosted by transfer gates in accordance with the teachings of the present invention. To illustrate, in the example depicted in FIG. 3C, the time between time t1 and time t2 is a reset period that occurs prior to a transfer operation. The transfer operation during which image charge is transferred to the floating diffusion occurs between time t3 and time t4 in the example. The specific example illustrated in FIG. 3C shows that during the time between time t1 and time t2, the reset control signal RST 332 is ON (e.g., logic high), the TX1 332 control signal of the active transfer gate 222, and the TX2/3/4 334 control signals of the idle transfer gates 224, 226, and 228 are all OFF at the lower OFF-voltage (e.g., −1.4 volts, or first OFF value). As such, the reset transistor 232 is ON, and the transfer gates 222, 224, 226, and 228 are OFF, which results in the shared floating diffusion FD 330 signal being reset through reset transistor 232.

At time t2, the reset period is completed, and the reset control signal RST is turned OFF, which results in the voltage on the shared floating diffusion FD 330 signal falling as shown, due to clock feedthrough and charge injection.

At time t2', which occurs after the reset period has been completed at time t2, and prior to the transfer operation, which begins at time t3, the TX1 332 control signal of the active transfer gate 222, and the TX2/3/4 334 control signals of the idle transfer gates 224, 226, and 228, are switched from the lower OFF-voltage (e.g., −1.4 volts, or first OFF value) to the normal OFF-voltage (e.g., −1.0 volts, or the normal OFF value). As such, even though all of the transfer gates 222, 224, 226, and 228 remain OFF, the voltage on the shared floating diffusion FD signal 330 is boosted by capacitive coupling when compared to a conventional signaling example (shown as dashed lines) in which the OFF voltages on the TX1 332 control signal of the active transfer gate 222, and the TX2/3/4 334 control signals of the idle transfer gates 224 remain the same as during the reset period between time t1 and t2. It is appreciated that in the example depicted in FIG. 3C, returning to the normal OFF-voltage (e.g., −1.0 volts, or the normal OFF value) after the reset period boosts the shared floating diffusion FD signal 330 for the remainder of the period as shown, instead of boosting only during the transfer operation between time t3 and time t4. This can increase the shared pixel output black level and allow more voltage headroom in readout circuits. This may also reduce stress on the transfer gates and reduce the dark current caused by gate induced drain leakage.

At time t3, the transfer operation begins such that the active transfer gate (e.g., transfer gate 222) is turned ON in response to the active transfer control signal TX1 322. As such, the active transfer control signal TX1 322 is pulsed to the ON voltage during the transfer operation from time t3 to time t4. At this time, image charge is transferred from the active photodiode P1 212 to the shared floating diffusion FD 230. Furthermore, at this time during the transfer operation between time t3 and t4, the transfer control signals TX2/3/4 324 of the idle transfer gates 224, 226, and 228, remain at the normal off-voltage (e.g., −1.0 volts or second OFF voltage) to maintain the boost of the shared floating diffusion FD signal 330 as shown in accordance with the teachings of the present invention. Indeed, as shown in FIG. 3C, the voltage on the shared floating diffusion FD signal 330 is boosted when compared to a conventional signaling example (shown as dashed lines) in which only a normal-OFF voltage (e.g., −1.0 volts) is used to turn OFF the transfer gates. Thus, it is appreciated that by boosting the voltage on the shared floating diffusion FD signal 330 during the transfer operation, charge transfer is facilitated and image lag is reduced in accordance with the teachings of the present invention. Continuing with the example, after time t4, the active transfer control signal TX1 322 returns back to a normal-OFF voltage (e.g., −1.0 volts or second OFF value), and the transfer control signals TX2/3/4 324 of the idle transfer gates 224, 226, and 228, remain at the normal OFF-voltage (e.g., −1.0 volts or second OFF value).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A shared pixel of an image sensor, comprising:
   a plurality of photodiodes coupled to photogenerate image charge in response to incident light;
   a shared floating diffusion coupled to receive the image charge transferred from each one of the plurality of photodiodes; and
   a plurality of transfer gates coupled between the plurality of photodiodes and the shared floating diffusion, wherein each one of the plurality of transfer gates is coupled to a corresponding one of the plurality of photodiodes,
   wherein each one of the plurality of transfer gates is coupled to receive a respective one of a plurality of transfer control signals to independently control the transfer of the image charge from the respective one of the plurality of photodiodes to the shared floating diffusion, wherein each one of the respective transfer control signals is coupled to be set to one of an ON value, a first OFF value, or a second OFF value,
   wherein a respective one of the plurality of control signals coupled to an active one of the plurality of transfer gates is coupled to be set to the ON value during a transfer operation,
   wherein respective ones of the plurality of control signals coupled to idle ones of the plurality of transfer gates are coupled to be set to the first OFF value during a reset period prior to the transfer operation, and are coupled to be set to the second OFF value during the transfer operation,
   wherein the first OFF value is sufficiently low to turn OFF a transfer gate, and sufficiently high to prevent dark current in the transfer gate, and
   wherein the second OFF value is greater than the first OFF value, and sufficiently low to turn off the transfer gate.

2. The shared pixel of claim 1, wherein the respective one of the plurality of control signals coupled to the active one of the plurality of transfer gates is coupled to be set to the first OFF value during the reset period.

3. The shared pixel of claim 1, wherein the respective one of the plurality of control signals coupled to the active one of the plurality of transfer gates is coupled to be set to the second OFF value during the reset period.

4. The shared pixel of claim 1, further comprising a reset transistor coupled to the shared floating diffusion, wherein the reset transistor is coupled to reset the shared floating diffusion during the reset period.

5. The shared pixel of claim 1, wherein the respective one of the plurality of control signals coupled to the active one of the plurality of transfer gates is coupled to be set to the second OFF value after the reset period and prior to the transfer operation, and wherein the respective ones of the plurality of control signals coupled to idle ones of the plurality of transfer gates are coupled to be set to the first OFF value after the reset period prior and to the transfer operation.

6. The shared pixel of claim 1, wherein the plurality of transfer control signals are coupled to be set to the first OFF value after the reset period and prior to the transfer operation.

7. The shared pixel of claim 1, wherein the plurality of transfer control signals are coupled to be set to the second OFF value after the reset period and prior to the transfer operation.

8. The shared pixel of claim 1, wherein the plurality of transfer control signals are coupled to be set to a same OFF value after the reset period and prior to the transfer operation, and after the transfer operation.

9. The shared pixel of claim 1, further comprising an amplifier transistor having an input terminal coupled to the shared floating diffusion to generate an amplified signal at an output terminal of the amplifier transistor.

10. The shared pixel of claim 9, further comprising a select transistor coupled between the output terminal of the amplifier transistor and an output bitline.

11. An imaging system, comprising:
    a pixel array including a plurality of groupings, wherein each one of the plurality of groupings includes:
    a plurality of photodiodes, wherein the plurality of photodiodes are coupled to photogenerate image charge in response to incident light;
    a shared floating diffusion coupled to receive the image charge transferred from each one of the plurality of photodiodes; and
    a plurality of transfer gates coupled between the plurality of photodiodes and the shared floating diffusion, wherein each one of the plurality of transfer gates is coupled to a corresponding one of the plurality of photodiodes,
    wherein each one of the plurality of transfer gates is coupled to receive a respective one of a plurality of transfer control signals to independently control the transfer of the image charge from the corresponding one of the plurality of photodiodes to the shared floating diffusion, wherein each one of the respective transfer control signals is coupled to be set to one of an ON value, a first OFF value, or a second OFF value,
    wherein a respective one of the plurality of control signals coupled to an active one of the plurality of transfer gates is coupled to be set to the ON value during a transfer operation,
    wherein respective ones of the plurality of control signals coupled to idle ones of the plurality of transfer gates are coupled to be set to the first OFF value during a reset period prior to the transfer operation, and are coupled to be set to the second OFF value during the transfer operation,
    wherein the first OFF value is sufficiently low to turn OFF a transfer gate, and sufficiently high to prevent dark current in the transfer gate, and wherein the second OFF value is greater than the first OFF value, and sufficiently low to turn off the transfer gate;

control circuitry coupled to the pixel array to control operation of the pixel array and to generate the plurality of transfer control signals; and readout circuitry coupled to the pixel array to readout image data from the plurality of photodiodes.

12. The imaging system of claim 11, further comprising function logic coupled to the readout circuitry to store the image data from each one of the plurality of photodiodes.

13. The imaging system of claim 11, wherein the respective one of the plurality of control signals coupled to the active one of the plurality of transfer gates is coupled to be set to the first OFF value during the reset period.

14. The imaging system of claim 11, wherein the respective one of the plurality of control signals coupled to the active one of the plurality of transfer gates is coupled to be set to the second OFF value during the reset period.

15. The imaging system of claim 11, further comprising a reset transistor coupled to the shared floating diffusion, wherein the reset transistor is coupled to reset the shared floating diffusion during the reset period prior to the transition operation.

16. The imaging system of claim 11, wherein the respective one of the plurality of control signals coupled to the active one of the plurality of transfer gates is coupled to be set to the second OFF value after the reset period and prior to the transfer operation, and wherein the respective ones of the plurality of control signals coupled to idle ones of the plurality of transfer gates are coupled to be set to the first OFF value after the reset period prior and to the transfer operation.

17. The imaging system of claim 11, wherein the plurality of transfer control signals are coupled to be set to the first OFF value after the reset period and prior to the transfer operation.

18. The imaging system of claim 11, wherein the plurality of transfer control signals are coupled to be set to the second OFF value after the reset period and prior to the transfer operation.

19. The imaging system of claim 11, wherein the plurality of transfer control signals are coupled to be set to a same OFF value after the reset period and prior to the transfer operation, and after the transfer operation.

20. The imaging system of claim 11, further comprising an amplifier transistor having an input terminal coupled to the shared floating diffusion to generate an amplified signal at an output terminal of the amplifier transistor.

21. The imaging system of claim 20, further comprising a select transistor coupled between the output terminal of the amplifier transistor and an output bitline coupled to the readout circuitry.

* * * * *